(12) United States Patent
Shieh et al.

(10) Patent No.: US 8,179,486 B2
(45) Date of Patent: May 15, 2012

(54) STRUCTURE AND LAYOUT OF PIXEL UNIT CELLS EACH HAVING CLOSELY DISPOSED BOTTOM PLATE AND BULK REGION

(75) Inventors: Kun-Yen Shieh, Tainan (TW); Shou-Cheng Chen, Tainan (TW)

(73) Assignee: Himax Display, Inc., Tainan (TW)

( * ) Notice: Subject to any disclaimer, the term of this patent is extended or adjusted under 35 U.S.C. 154(b) by 784 days.

(21) Appl. No.: 12/168,101

(22) Filed: Jul. 4, 2008

(65) Prior Publication Data

US 2010/0002160 A1    Jan. 7, 2010

(51) Int. Cl.
  *G02F 1/1343*    (2006.01)
  *G02F 1/136*     (2006.01)

(52) U.S. Cl. ............................................ 349/38; 349/43

(58) Field of Classification Search ............... 349/38, 349/43

See application file for complete search history.

(56) References Cited

U.S. PATENT DOCUMENTS

| | | | | |
|---|---|---|---|---|
| 2004/0075629 A1* | 4/2004 | Yasukawa | ............... | 345/87 |
| 2008/0136758 A1* | 6/2008 | Ohta et al. | ............... | 345/87 |
| 2008/0151155 A1* | 6/2008 | Takizawa et al. | ............... | 349/106 |
| 2008/0225190 A1* | 9/2008 | Chen et al. | ............... | 349/38 |
| 2008/0251791 A1* | 10/2008 | Yeh et al. | ............... | 257/71 |

* cited by examiner

*Primary Examiner* — Nathanael R Briggs
(74) *Attorney, Agent, or Firm* — Squire Sanders (US) LLP

(57) ABSTRACT

A structure and layout of the pixel unit cell of a display panel. The pixel capacitor of the pixel unit cell includes a bottom plate and an overlying top plate. The bottom plate is adjacent to a bulk region without having substantive separating distance therebetween, thereby substantially increasing the size of the overlapped area and the associated the effective capacitance of the bottom plate and the top plate.

20 Claims, 10 Drawing Sheets

US 8,179,486 B2

STRUCTURE AND LAYOUT OF PIXEL UNIT CELLS EACH HAVING CLOSELY DISPOSED BOTTOM PLATE AND BULK REGION

BACKGROUND OF THE INVENTION

1. Field of the Invention

The present invention generally relates to a display panel, and more particularly to the structure and layout of pixel unit cells of liquid crystal on silicon (LCOS) display panel.

2. Description of the Prior Art

Liquid crystal on silicon (LCOS or LCoS) is a reflective technology that can produce higher resolution image, at lower cost, than liquid crystal display (LCD), and has been developed as the optical engine for micro-projection or micro-display system. FIG. 1 shows a pixel unit cell circuit 10, which includes a metal-oxide-semiconductor (MOS) addressing transistor 12 and a pixel capacitor 14. The gate G of the MOS transistor 12 is connected to and addressed by a scan line (SCAN), and the source S of the MOS transistor 12 is connected to a data line (DATA) for receiving image data. The drain D of the MOS transistor 12 is connected to the pixel capacitor 14, which is implemented by connecting its drain, source and bulk VDDA together (or usually called MOS capacitor in the field). FIG. 2A shows the layout of a pixel block consisting of eight pixel unit cells. FIG. 2B shows an enlarged view of the layout of the pixel capacitor 14 of a pixel unit cell, and FIG. 2C shows the corresponding cross-sectional view of FIG. 2B along the line 2C-2C'. In the figures, a pixel cap bottom plate (or usually called OD layer in the field) 140 and a pixel cap top plate (or a polysilicon layer) 142 partially overlap. The size of the overlapped area then determines its effective capacitance, which is one of main issues to be improved for a better LCoS performance. According to the cross section of FIG. 2C, the pixel cap bottom plate 140 is separated from the bulk region 144 with a distance 147 approximately equivalent to that of a field oxidation (FOX) 146. This separating distance due to the FOX 146 occupies precious area of the pixel cap bottom plate 140.

For the foregoing reasons, a need has arisen to propose a novel structure and layout of pixel unit cells for effectively improving the effective capacitance of the pixel capacitor and the LCoS performance.

SUMMARY OF THE INVENTION

In view of the foregoing, it is an object of the present invention to provide a novel structure and layout of pixel unit cells for effectively improving the effective capacitance of the pixel capacitor of a display panel. It is another object of the present invention to improve performance of the display panel with a specific color filer arrangement. It is a further object of the present invention to increase manufacture yield by specifically manufacturing the scan lines each having more pixel unit cells connected.

According to one embodiment, the present invention provides a structure and layout of the pixel unit cell of a display panel, such as LCoS panel. The pixel unit cell includes an addressing transistor having a gate addressed by a scan line, a source connected to a data line; and a pixel capacitor electrically coupled to a drain of the addressing transistor. The pixel capacitor includes a bottom plate and an overlying top plate, wherein the top plate partially overlaps the bottom plate. The bottom plate is adjacent to a bulk region without having substantive separating distance therebetween, thereby substantially increasing the size of the overlapped area (and the associated effective capacitance) of the bottom plate and the top plate, and also improving the LCoS performance.

DETAILED DESCRIPTION OF THE INVENTION

Figure 1:
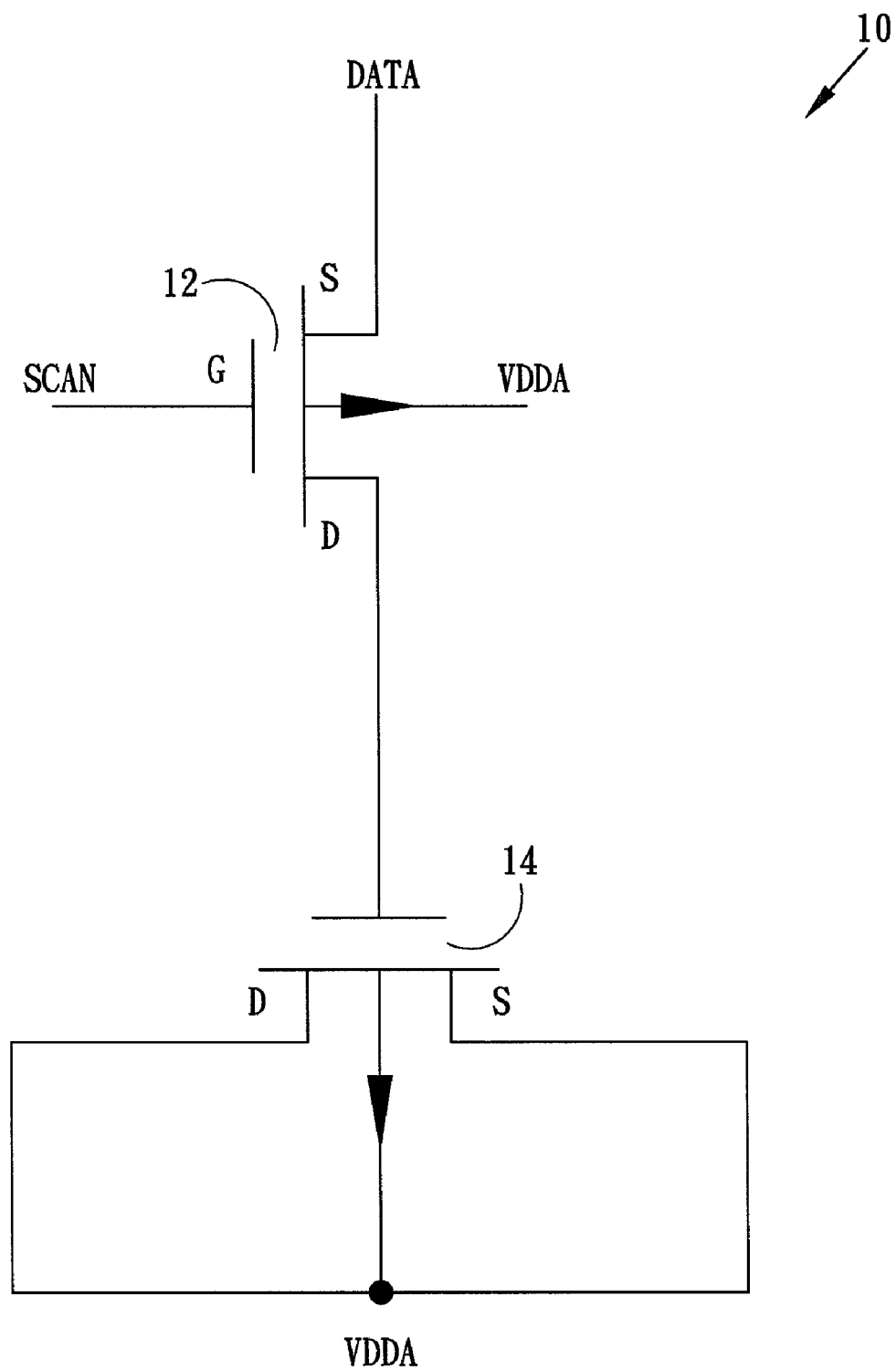
FIG. 1 shows a pixel unit cell circuit.
Figure 3A:
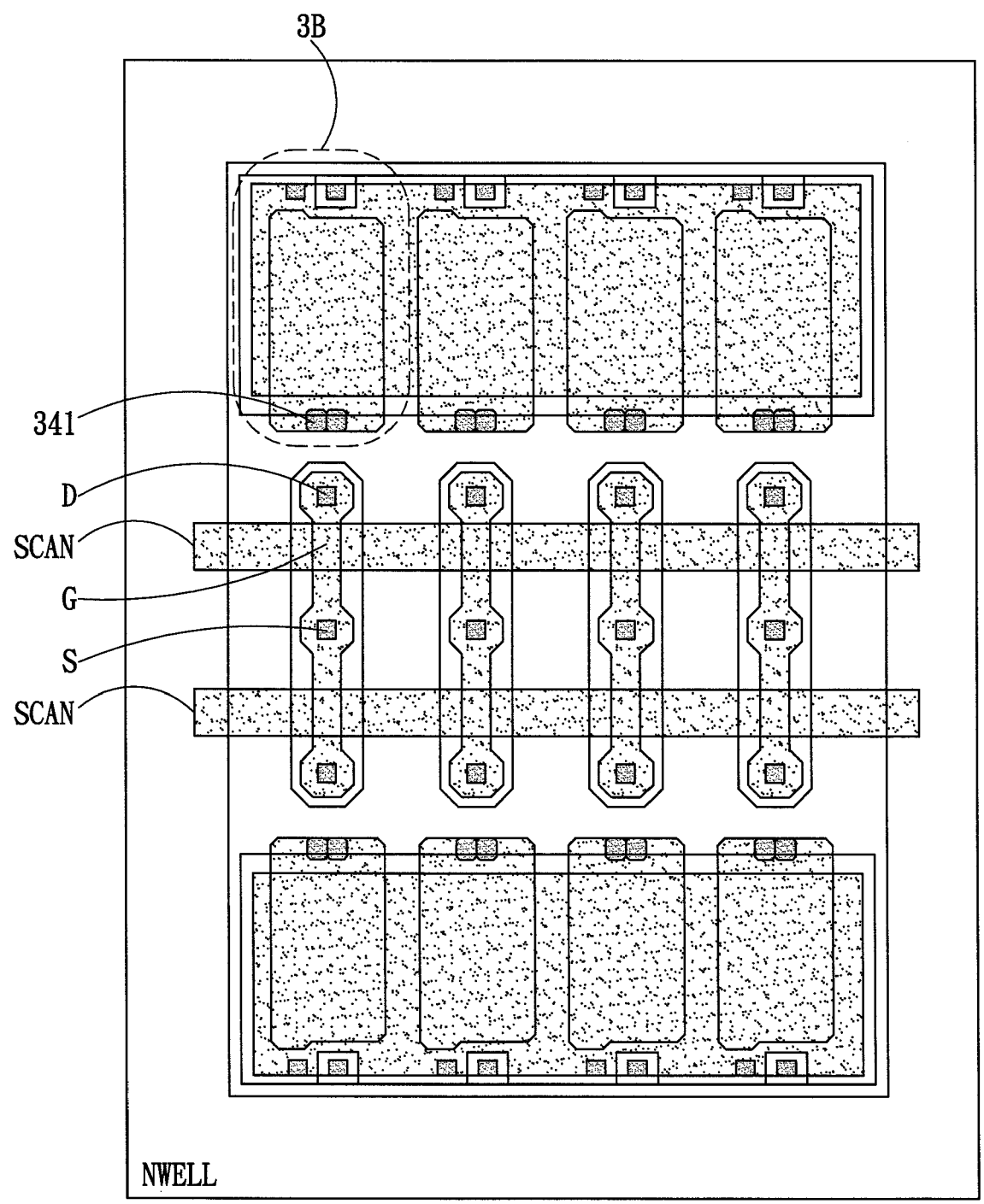
FIG. 3A shows an exemplary layout of a pixel block consisting of eight pixel unit cells according to one embodiment of the present invention.

FIG. 3A shows an exemplary layout of a pixel block consisting of, but not limited to, eight pixel unit cells according to one embodiment of the present invention. In the embodiment, the circuit of one of the pixel unit cells may be schematically illustrated by the same pixel unit cell circuit shown in FIG. 1, and the same numerals and letters are likewise used in the embodiment.

Figure 3B:
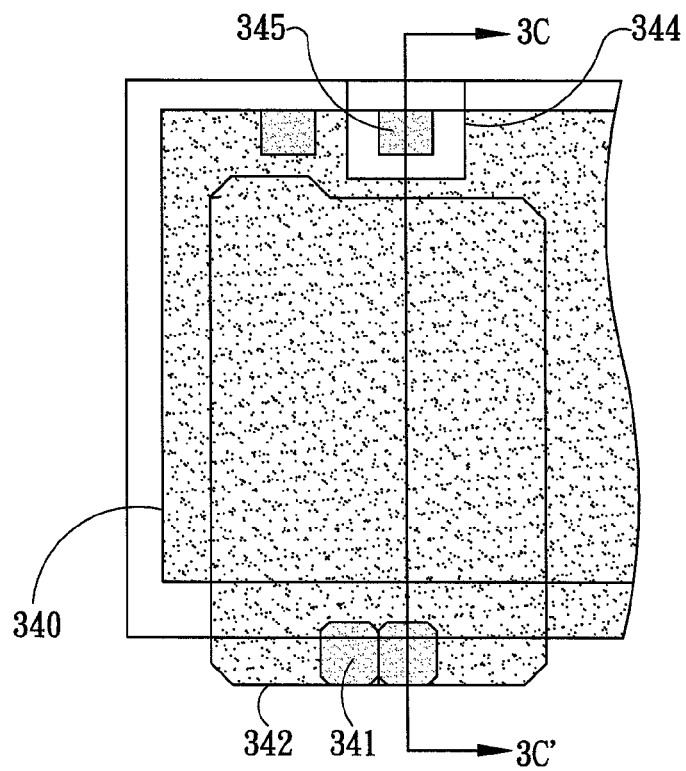
FIG. 3B shows an enlarged view of the layout of the pixel capacitor of a pixel unit cell of FIG. 3A.
Figure 3C:
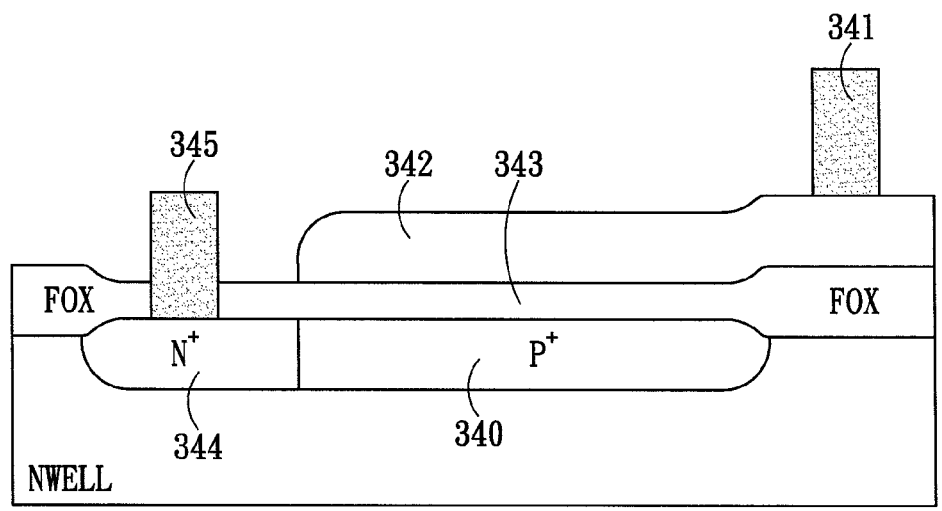
FIG. 3C shows the corresponding cross-sectional view of FIG. 3B.

Referring to FIG. 3A, the gates G of the upper MOS addressing transistors 12 are connected together by a scan line (SCAN), and the gates G of the lower MOS addressing transistors 12 are connected together by another scan line (SCAN). Situated below and above each gate G are corresponding source S and drain D of the MOS transistors 12. The upper MOS transistor 12 and the lower MOS transistor 12 in the same column share a source S. The drain D is connected, via contact plug or plugs 341, to a pixel capacitor 14, which is made of a pixel cap bottom plate (or usually called OD layer in the field) 340 and a pixel cap top plate (or a polysilicon layer) 342, as illustrated in the enlarged view of the layout of the pixel capacitor 14 of a pixel unit cell in FIG. 3B. FIG. 3C shows the corresponding cross-sectional view of FIG. 3B along the line 3C-3C'. In the figures, the pixel cap bottom plate 340 and the pixel cap top plate 342 partially overlap. As mentioned above, the size of the overlapped area then determines its effective capacitance, which is one of main issues to be improved for a better LCoS performance according to the embodiment of the present invention. Although the LCoS is demonstrated, the embodiment, however, can be well adapted to other flat panel display, such as liquid crystal display (LCD).

The cross section shown in FIG. 3C is illustrated for a p-type metal-oxide-semiconductor (PMOS) structure and process. A person skilled in the pertinent art, however, knows how to adapt the structure and process to n-type metal-oxide-semiconductor (NMOS) technique. For example, the n-type diffusion region (such as N⁺) is replaced by a p-type diffusion region (P⁺) in the NMOS technology, and vice versa. Further, the n-type well (NWELL) is replaced by a p-type substrate in the NMOS technique.

Figure 2A:
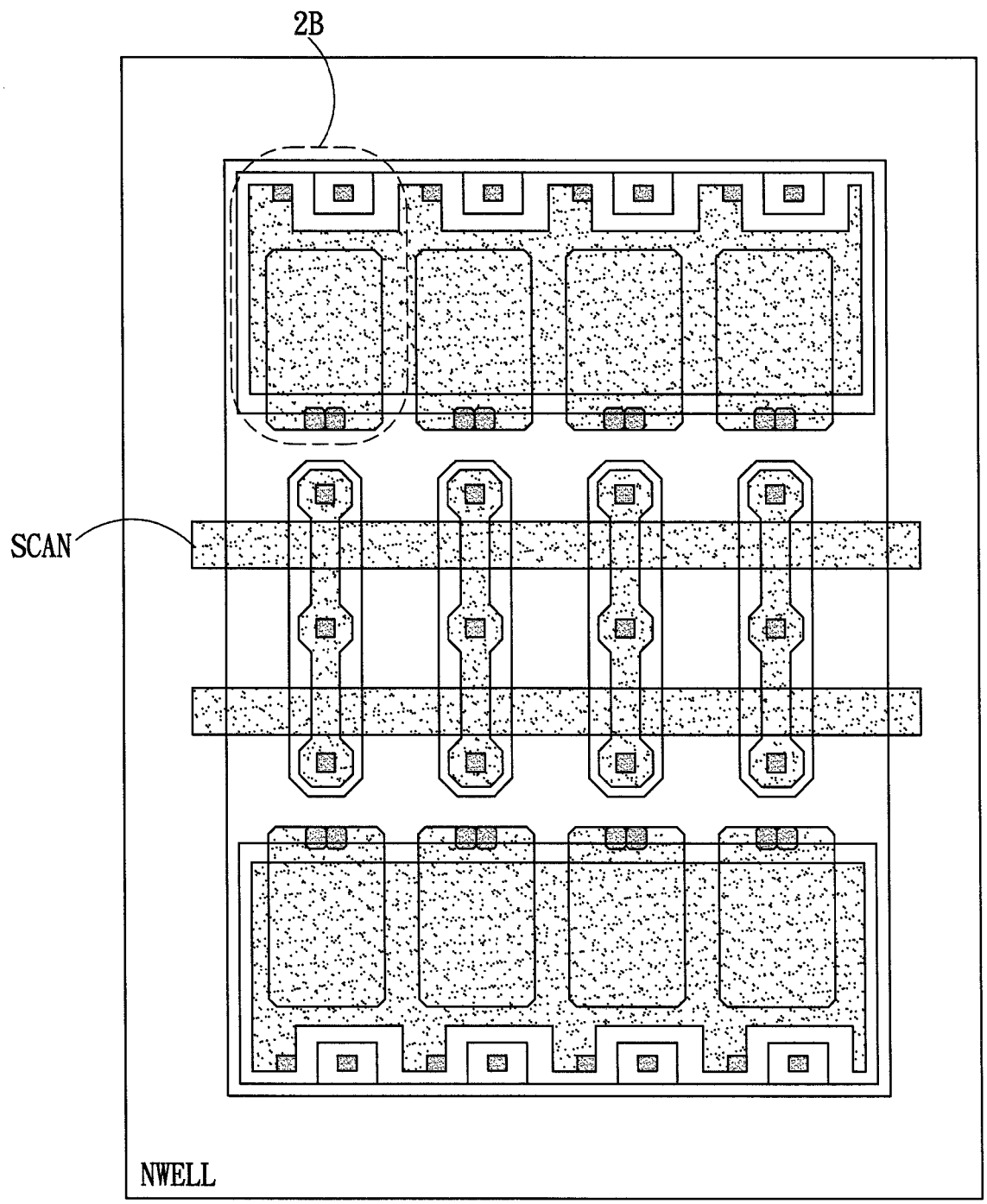
FIG. 2A shows the layout of a pixel block consisting of eight pixel unit cells.
Figure 2B:
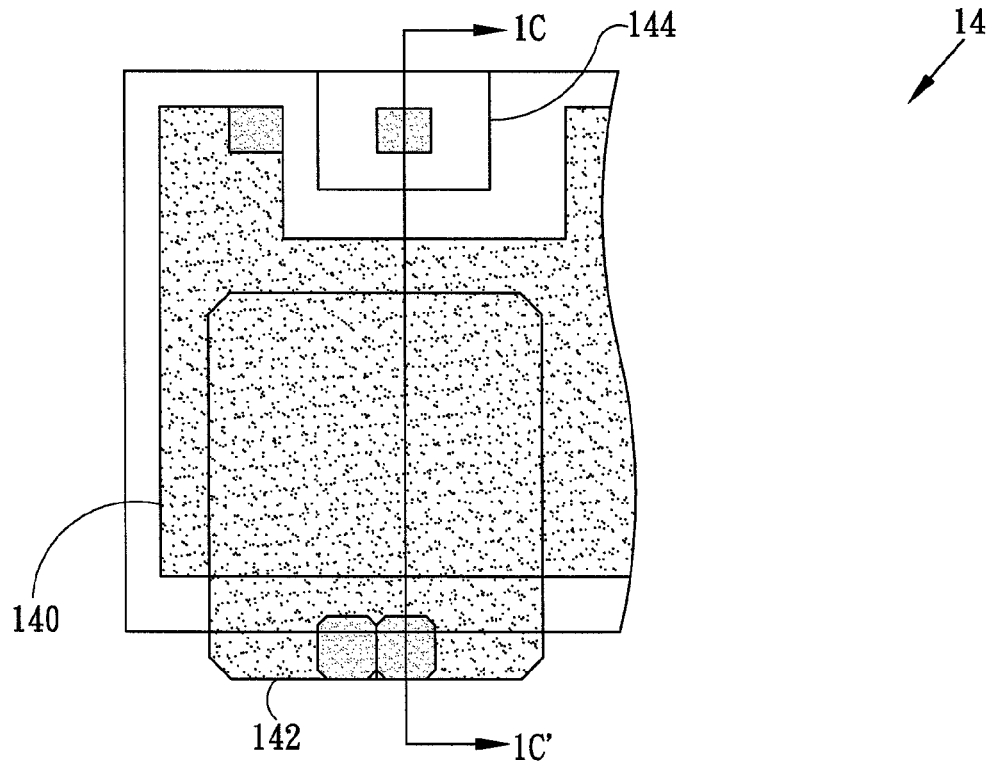
FIG. 2B shows an enlarged view of the layout of the pixel capacitor of a pixel unit cell.
Figure 2C:
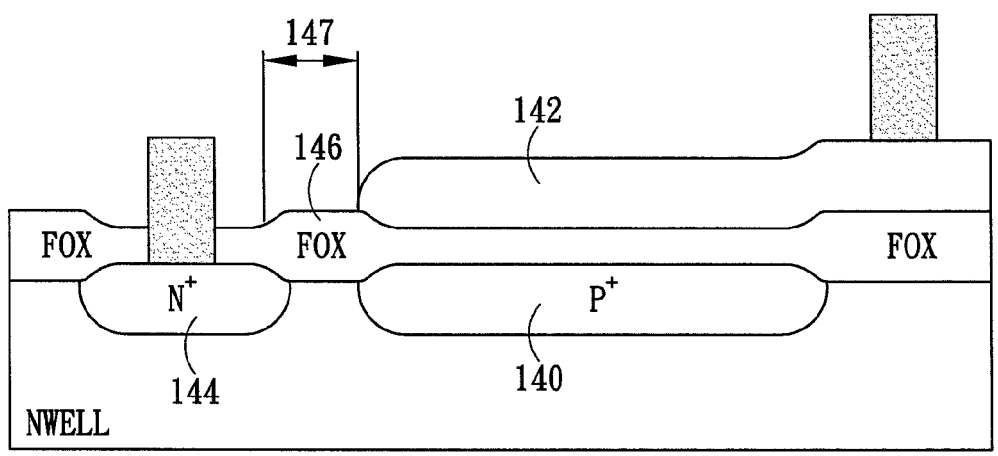
FIG. 2C shows the corresponding cross-sectional view of FIG. 2B.

Still referring to FIG. 3C, the P⁺ pixel cap bottom plate 340 and the N⁺ bulk region 344 are formed, using conventional semiconductor process, in the n-type well (NWELL). The pixel cap bottom plate 340 and the bulk region 344 are generally doped with p-type and n-type dopants respectively, by using diffusion or ion implantation technique. In the embodiment, the pixel cap bottom plate 340 and the bulk region 344, which are situated approximately on the same level, are adjacent to each other without having substantive separating distance therebetween. The pixel cap top plate 342, which may be made of polysilicon, is situated above the pixel cap bottom plate 340, and is separated and insulated from the pixel cap bottom plate 340 by a dielectric layer 343, such as silicon oxidation layer. A contact plug or plugs 345 are formed to electrically connect the bulk region 344. As the pixel cap bottom plate 340 is adjacent to, or neighboring, the bulk region 344, no substantive separating space exists between the boundary of the pixel cap bottom plate 340 and the bulk region 344, as shown in FIG. 3B. Accordingly, the distance between the boundary of the pixel cap top plate 342 and the boundary of the contact plug 345 could be substantially reduced. The size of the overlapped area of the pixel cap bottom plate 340 and the pixel cap top plate 342 could therefore substantially increase. Equivalently speaking, the effective capacitance of the pixel capacitor 14 increases and the LCoS performance thus is improved. For example, the overlapped area in one of the exemplary embodiment is 25.76 $\mu m^2$, while the overlapped area in FIG. 2B under the same semiconductor process is 21.32 $\mu m^2$. In other words, the size of the overlapped area or the effective capacitance is improved by 20.8% (i.e., (25.76−21.32)/21.32).

Figure 4A:
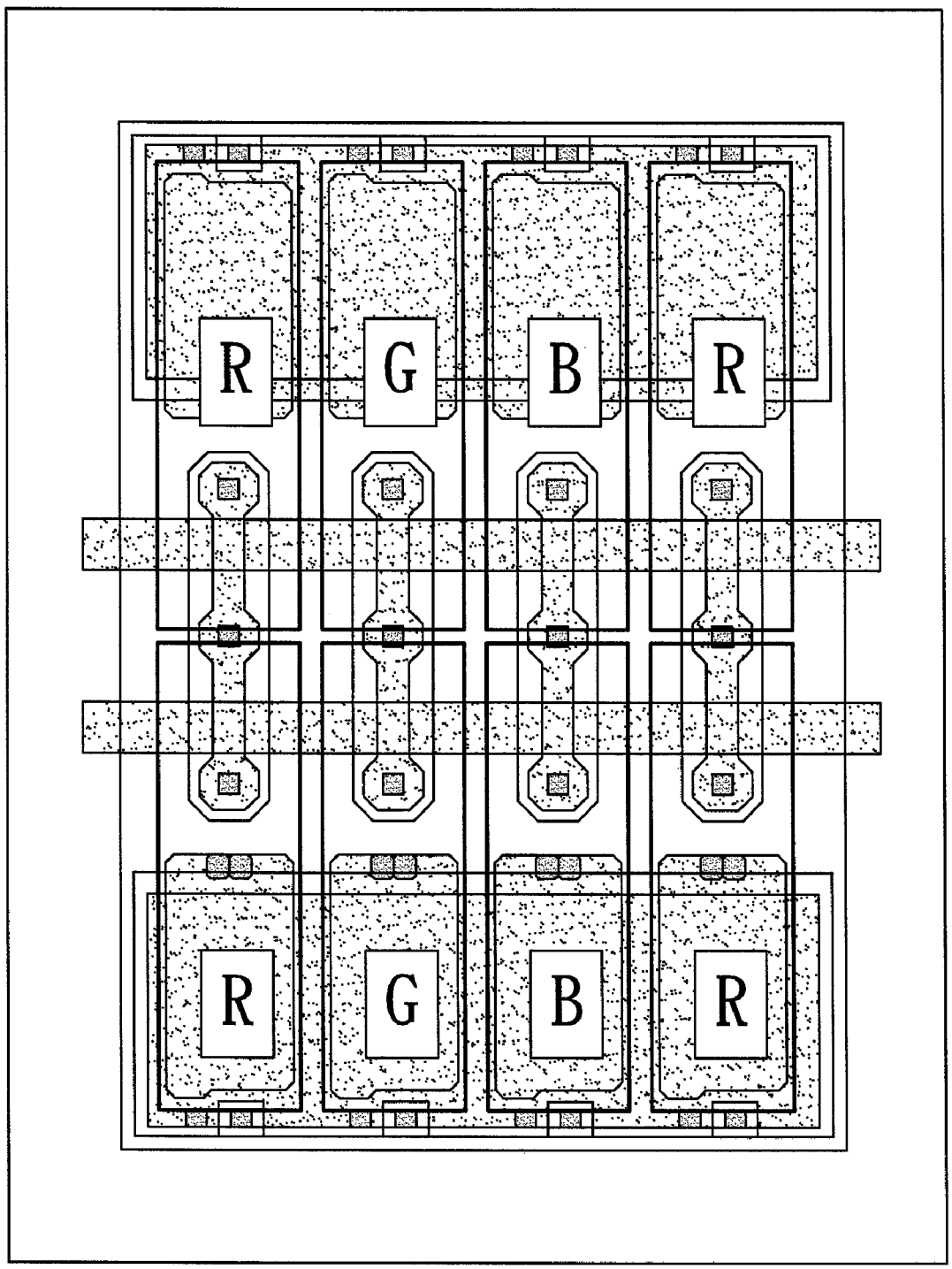
FIG. 4A illustrates an exemplary layout of the eight-cell pixel block with added color filter according to another embodiment of the present invention.
Figure 4B:
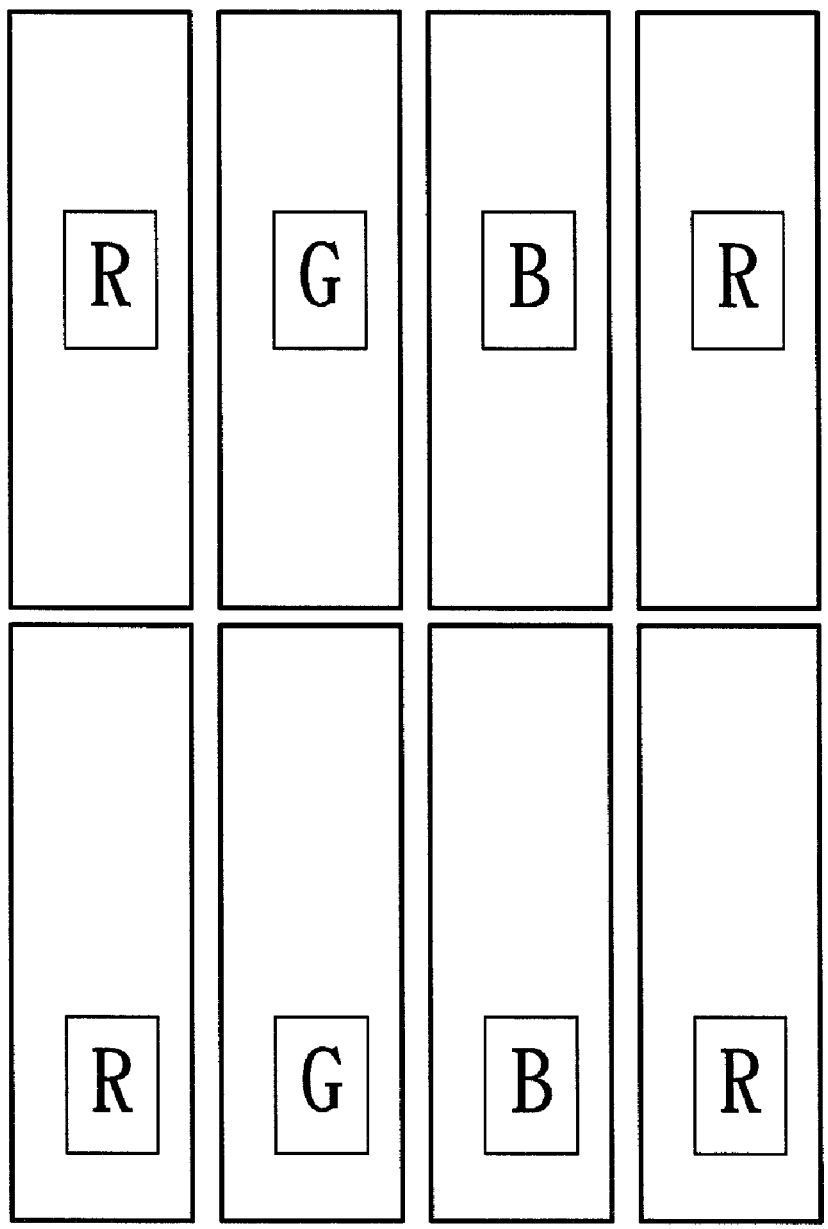
FIG. 4B illustrates the corresponding color filter excluding the underlying pixel cells of FIG. 4A.

FIG. 4A illustrates an exemplary layout of the eight-cell pixel block with added color filter according to another embodiment of the present invention, and FIG. 4B illustrates the corresponding color filter excluding the underlying pixel cells. The color filter is formed above the pixel block, and may be manufactured using conventional or future process, and the details are thus omitted for brevity. As shown in the figures, the red, green and blue color areas (R, G and B) are arranged in stripe manner, in which the color areas with the same color are arranged in a straight line, and the color filter as a whole is thus named as stripe color filter.

Figure 5A:
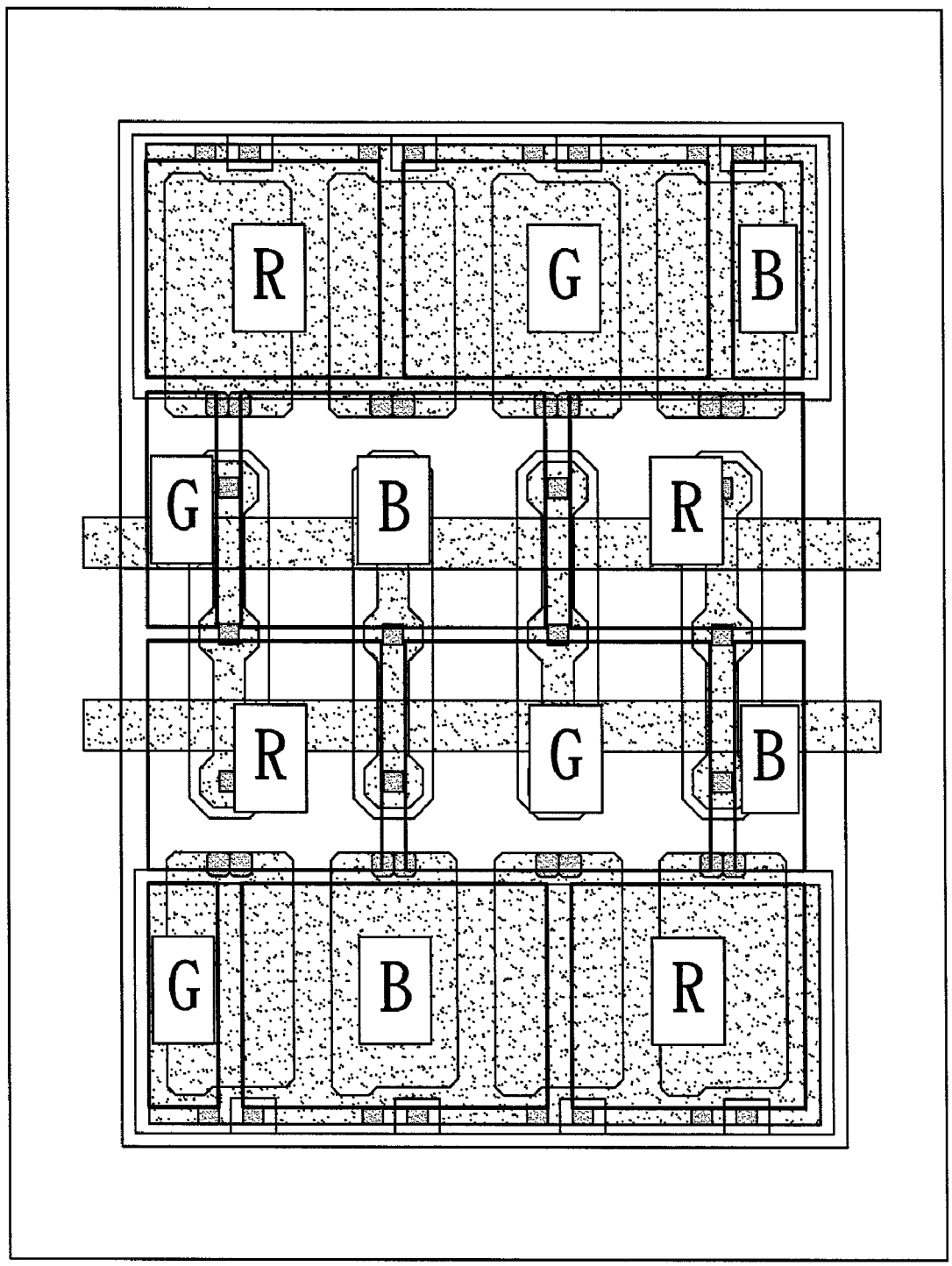
FIG. 5A illustrates another exemplary layout of the eight-cell pixel block with added color filter according to a further embodiment of the present invention.
Figure 5B:
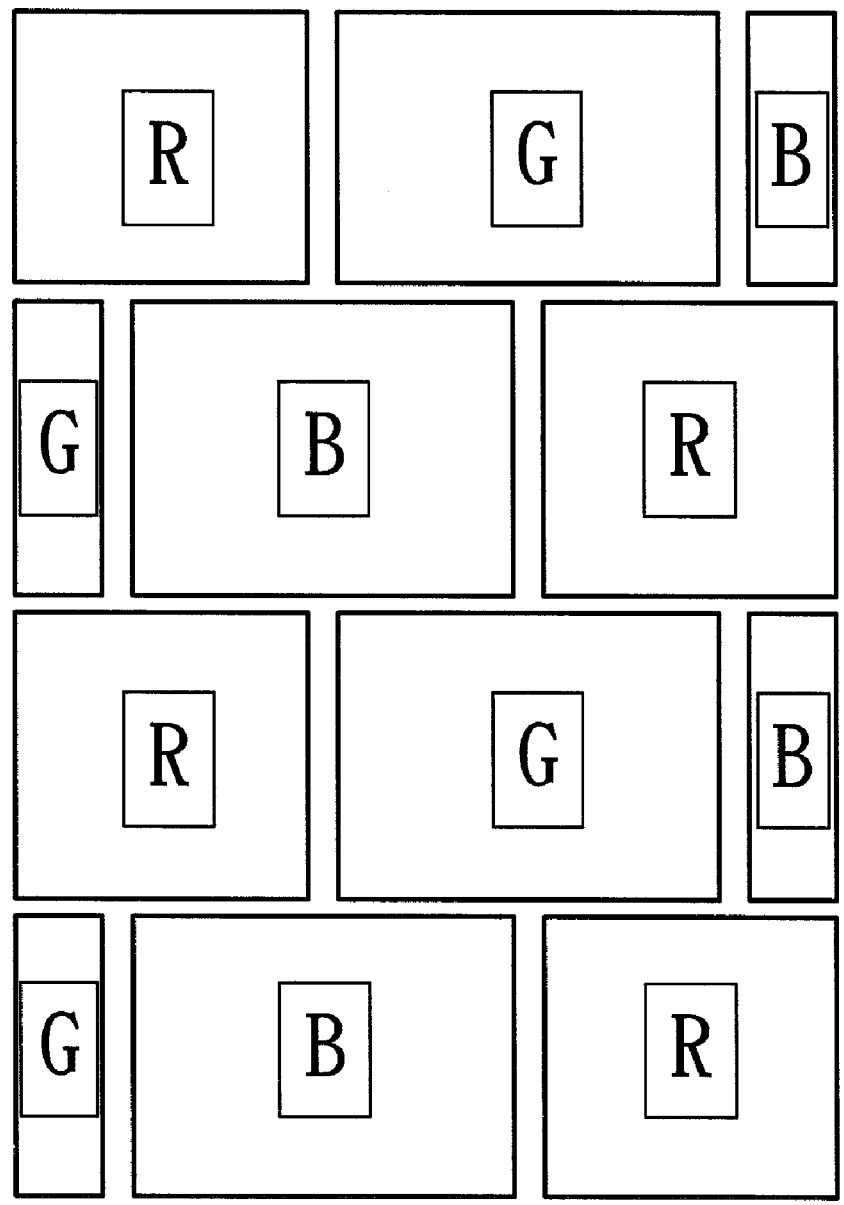
FIG. 5B illustrates the corresponding color filter excluding the underlying pixel cells of FIG. 5A.

FIG. 5A illustrates another exemplary layout of the eight-cell pixel block with added color filter according to a further embodiment of the present invention, and FIG. 5B illustrates the corresponding color filter excluding the underlying pixel cells. As shown in the figures, the red, green and blue color areas (R, G and B) are arranged in delta manner, in which the R, G and B color areas are arranged in a triangular region, and the color filter as a whole is thus named as delta color filter. Further, the color area in the delta color filter does not exactly covers one pixel unit cell as in the stripe color filter; instead, the color area in the delta color filter, in the exemplary embodiment, covers approximately half pixel unit cell in length, and covers approximately one and half pixel unit cells in width. According to this embodiment, the use of the delta color filter arrangement further improves the LCoS performance.

Figure 6:
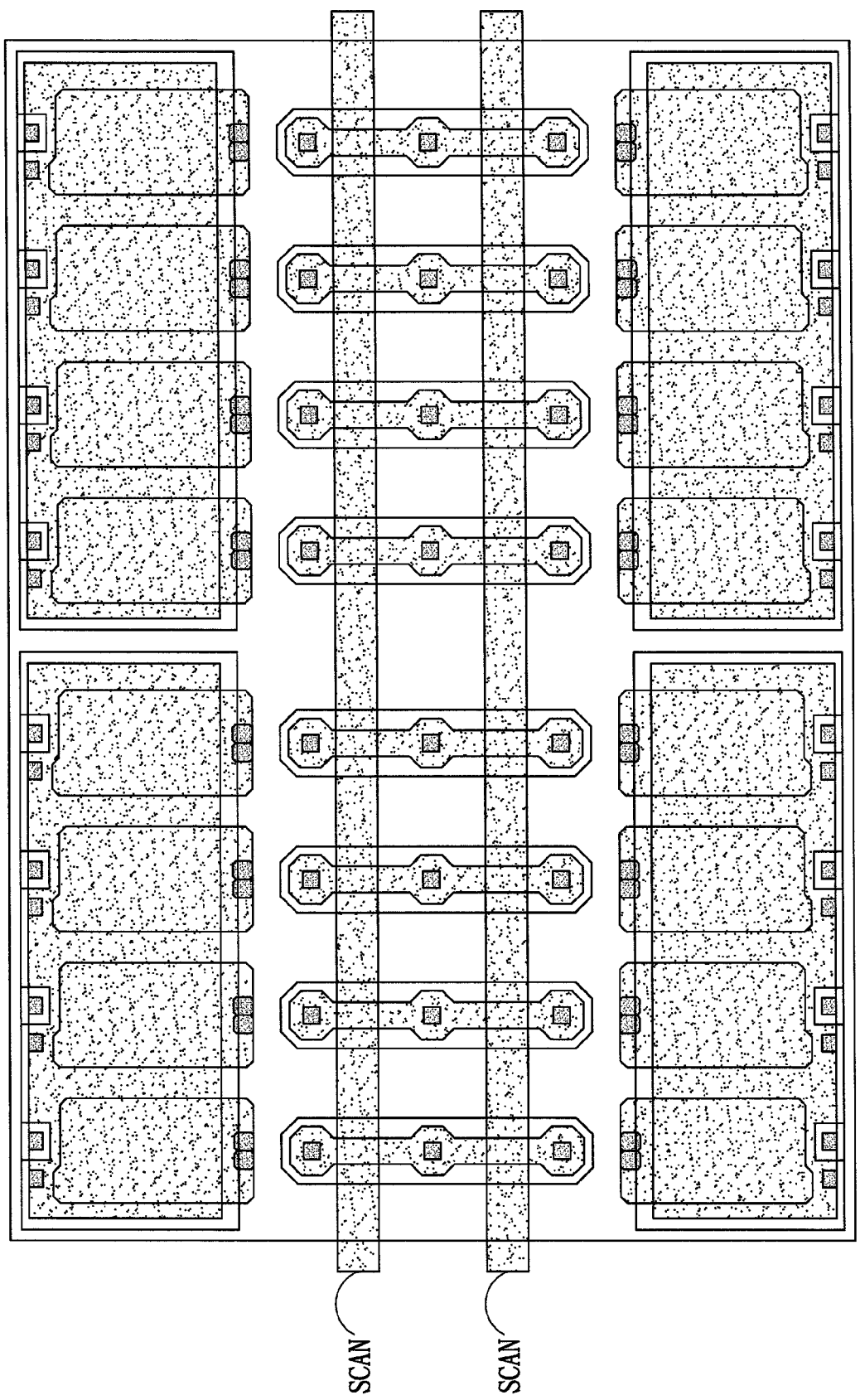
FIG. 6 shows an exemplary layout of a pixel block consisting of sixteen pixel unit cells according to a further embodiment of the present invention.

FIG. 6 shows an exemplary layout of a pixel block consisting of sixteen pixel unit cells according to a further embodiment of the present invention. This sixteen-cell pixel block has similar composing elements as the eight-cell pixel block discussed above, and their details are omitted for brevity. Although the sixteen-cell pixel block is illustrated, the present embodiment can be adapted to other pixel block having the number of the pixel unit cells other than sixteen (16). The difference, compared to the eight-cell pixel block, is that each scan line (SCAN) in the sixteen-cell pixel block is connected, without using any contact, among eight (8) cells, rather than connected among four (4) cells as in the previous eight-cell pixel block. An entire LCoS display or projector using the present embodiment has greater yield than the previous embodiments (or conventional ones) because the present embodiment uses fewer number of scan lines, which causes fewer probability of manufacture failure.

Although specific embodiments have been illustrated and described, it will be appreciated by those skilled in the art that various modifications may be made without departing from the scope of the present invention, which is intended to be limited solely by the appended claims.

What is claimed is:

1. A pixel unit cell of a display panel, comprising:
an addressing transistor having a gate addressed by a scan line, a source connected to a data line; and
a pixel capacitor electrically coupled to a drain of the addressing transistor, the pixel capacitor including a bottom plate and an overlying top plate, wherein the top plate partially overlaps the bottom plate;
wherein the bottom plate is adjacent to a bulk region without having substantive separating distance therebetween;
wherein the bulk region has a first conductivity type opposite to a second conductivity type of the bottom plate and the source and the drain of the addressing transistor; and
wherein the bulk region and the bottom plate are formed in a well having the first conductivity type.

2. The pixel unit cell of claim 1, wherein the display panel is liquid crystal on silicon (LCOS) panel.

3. The pixel unit cell of claim 1, wherein the pixel capacitor includes a transistor having a source and a drain, which are connected to a bulk of the transistor.

4. The pixel unit cell of claim 1, wherein the bottom plate and the bulk region are formed on a same level in the well.

5. The pixel unit cell of claim 4, wherein the bottom plate is a p-type doped region, the bulk region is n-type doped region, and the well is an n-type well.

6. The pixel unit cell of claim 1, wherein a plurality of the pixel unit cells form a pixel block.

7. The pixel unit cell of claim 6, wherein gates of the pixel unit cells in a row of the pixel block are connected together by a scan line.

8. The pixel unit cell of claim 6, further comprising a color filter formed above the pixel block, the color filter including red color areas, green color areas and blue color areas, which are arranged in stripe manner, where the color areas with the same color are arranged in a straight line.

9. The pixel unit cell of claim 6, further comprising a color filter formed above the pixel block, the color filter including red color areas, green color areas and blue color areas, which are arranged in delta manner, where the red color area, the green color area and the blue color area are arranged in a triangular region.

10. The pixel unit cell of claim 9, wherein the color area covers approximately half the pixel unit cell in length, and covers approximately one and half the pixel unit cells in width.

11. The pixel unit cell of claim 6, wherein the pixel block includes sixteen pixel unit cells, wherein half of the pixel unit cells in a row are connected together by a scan line without using contact.

12. A method of arranging layout of a pixel unit cell of a display panel, comprising:
   forming a pixel capacitor, which includes a bottom plate and an overlying top plate, wherein the top plate partially overlaps the bottom plate; and
   disposing a bulk region adjacent to the bottom plate without having substantive separating distance therebetween;
   wherein the bulk region has a first conductivity type opposite to a second conductivity type of the bottom plate and a source and a drain of an addressing transistor of the pixel unit cell; and
   wherein the bulk region and the bottom plate are formed in a well having the first conductivity type.

13. The method of claim 12, wherein the display panel is liquid crystal on silicon (LCOS) panel.

14. The method of claim 12, wherein the bottom plate and the bulk region are formed on a same level in the well.

15. The method of claim 12, further comprising forming a plurality of the pixel unit cells, thereby making a pixel block.

16. The method of claim 15, further comprising disposing a scan line to connect the pixel unit cells in a row of the pixel block.

17. The method of claim 15, further comprising forming a color filter above the pixel block, the color filter including red color areas, green color areas and blue color areas, which are arranged in stripe manner, where the color areas with the same color are arranged in a straight line.

18. The method of claim 15, further comprising forming a color filter above the pixel block, the color filter including red color areas, green color areas and blue color areas, which are arranged in delta manner, where the red color area, the green color area and the blue color area are arranged in a triangular region.

19. The method of claim 18, wherein the color area covers approximately half the pixel unit cell in length, and covers approximately one and half the pixel unit cells in width.

20. The method of claim 15, wherein the pixel block includes sixteen pixel unit cells, wherein half of the pixel unit cells in a row are connected together by a scan line without using contact.

* * * * *